United States Patent
Mays

[11] 3,837,243
[45] Sept. 24, 1974

[54] RUBBER-MATERIAL INSERTER
[76] Inventor: Wilburt W. Mays, 2020 N. 8th St., Philadelphia, Pa. 19122
[22] Filed: May 24, 1973
[21] Appl. No.: 363,409

[52] U.S. Cl. .............................................. 81/15.7
[51] Int. Cl. ......................................... B60c 25/16
[58] Field of Search.................... 81/15.7, 15.2, 15.5

[56] References Cited
UNITED STATES PATENTS
3,237,490  3/1966  Mays.................................. 81/15.7

Primary Examiner—Othell M. Simpson
Assistant Examiner—Roscoe V. Parker
Attorney, Agent, or Firm—Clarence A. O'Brien; Harvey B. Jacobson

[57] ABSTRACT

A tool for inserting a headed rubber plug, and the like, into an inflatable device has a body formed by an elongated hollow cylinder with spaced first and second end portions and an opening provided in a wall of the cylinder adjacent the first end portion. A conical head is attached to the cylinder at its first end portion, with an apex of this conical head arranged pointed away from the cylinder for facilitating insertion of the apparatus into an opening of an inflatable member to be repaired. A manually manipulatable clamp has a cutting edge and associated wedge arranged in the cylinder for selective engagement with the tail portion of an insert member inserted into the cylinder through the wall opening for selectively severing and holding the tail portion. The wall of the cylinder in which the opening is provided is thicker than the other portions of the cylinder wall to permit a recess to be defined therein and arranged about the wall opening to receive the head or enlarged portion of an insert member. When the tail portion has been severed from the remainder of the insert member adjacent its head, the tail portion will be retained by cooperation of the wedge with a V-shaped projection extending from an inner wall surface of the cylinder.

15 Claims, 8 Drawing Figures

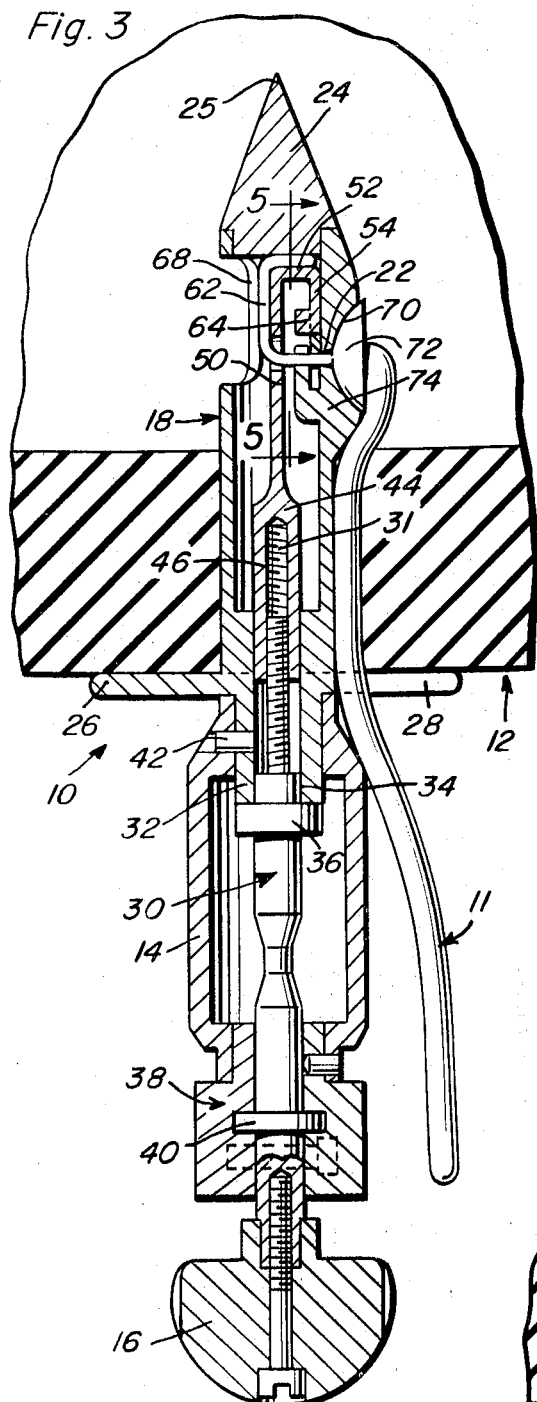
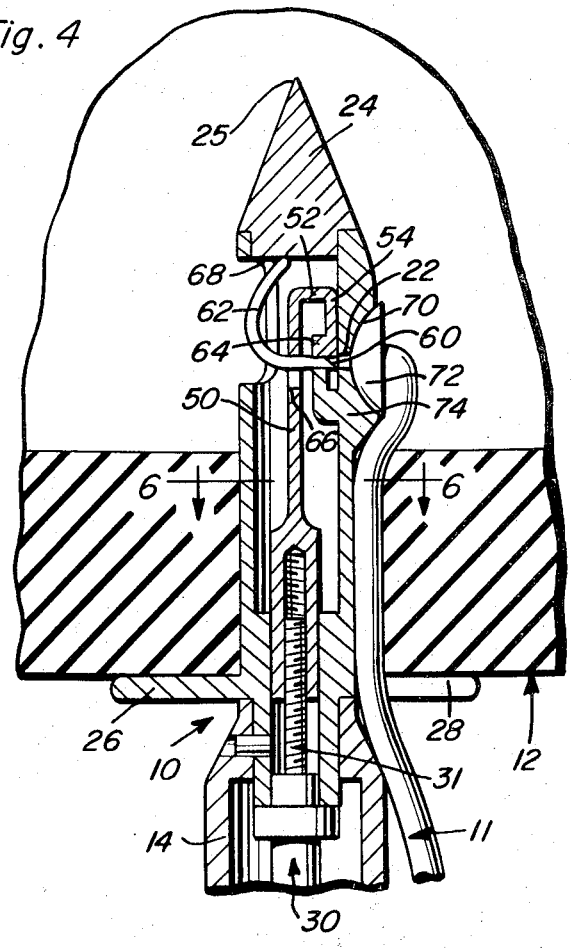
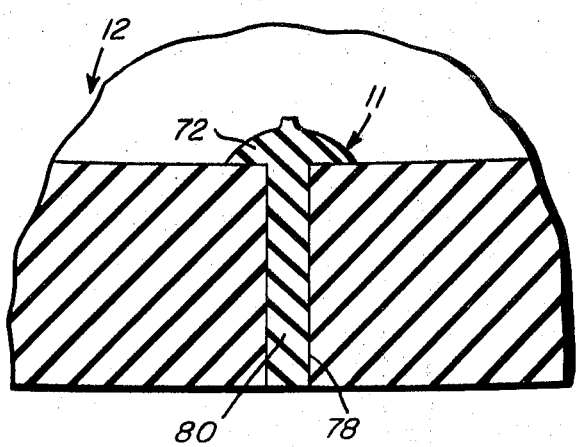
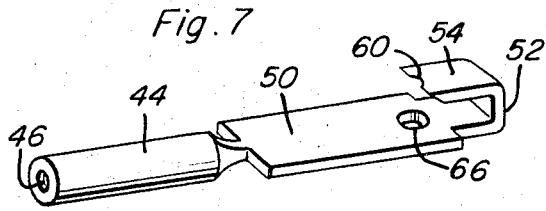

RUBBER-MATERIAL INSERTER

BACKGROUND OF THE INVENTION

1. Field of the Invention

This invention relates generally to a tool for repairing punctures in inflatable devices, and particularly to apparatus for inserting headed plug into a punctured tubeless tire without removing the tire from its associated wheel.

2. Description of the Prior Art

It is known to repair tubeless tires, and the like, while they are still mounted on an associated wheel because of the difficulty in removing such tires from a wheel. The most commonly used tool for inserting a plug into a tubeless tire puncture has a needle-like shape which may overshoot and drop into the tire. My U.S. Pat. No. 3,237,490, issued Mar. 1, 1966, eliminates the possibility of losing a tool in the tire, but has the disadvantage that the withdrawal of the tool may either dislodge a severed portion of the plug from the tool and permit it to drop into the tire, or withdraw the plug from the tire along with the tool.

SUMMARY OF THE INVENTION

It is an object of the present invention to provide an improved plug inserting apparatus which will retain a severed portion of the plug and prohibit it from remaining inside an inflatable member being repaired.

It is another object of the present invention to provide a plug inserting apparatus capable of inserting plugs of a kind which cannot be readily pulled back through the puncture being repaired.

It is still another object of the present invention to provide a plug inserting apparatus having improved reliability and efficiency with respect to known apparatus of this kind.

These and other objects are achieved by providing a plug inserting apparatus having: a body; a clamping device arranged on the body for clampingly engaging an insert element, and including a cutting and holding member for severing an engaged insert element and holding a severed portion of the insert element in the camping arrangement; and a device connected to the clamping arrangement for selectively controlling same by activating the clamping arrangement for selectively securing and releasing the insert element.

The body is advantageously formed by an elongated, hollow cylinder with spaced first and second end portions and an opening provided adjacent the first end portion. The clamping arrangement is positioned in the cylinder adjacent the cylinder opening, while the control device is arranged at the second end portion. A conical head is provided on the cylinder at its first end portion, and is arranged with an apex pointed away from the cylinder for facilitating insertion of the apparatus into an opening of an inflatable member to be repaired.

The control arrangement preferably has a rod including a portion provided with screw threads. The rod is journaled in an appropriate fitting provided at the second end portion of the cylinder. A handle is connected to the rod for manually rotating same. A hollow housing is mounted on the cylinder at the second end portion thereof, and is arranged extending parallel to the rod and away from the second end portion. A bearing is mounted on the hollow housing, and is spaced from the second end portion for receiving the rod at a point spaced from the second end portion.

The clamping arrangement may have a longitudinal shaft provided with a bore extending along the longitudinal extent of the shaft and provided with internal screw threads arranged for engaging the threads on the control device rod and mounting the shaft on the rod for longitudinal movement with respect thereto. At least one rotation preventing longitudinal groove is provided on the inner surface of the body cylinder, and a plate member extending from the shaft parallel to the lontitudinal extent thereof is arranged in this groove for being guided longitudinally thereby. The gripping element is connected to and arranged extending perpendicularly from the plate member, while a cutting and holding member is connected to and arranged extending perpendicularly from the gripping member and parallel to the plate member. A projection provided on the cylinder adjacent its opening cooperates with the cutting and holding member to form the cutting arrangement. The gripping member is arranged for selectively cooperating with the head to clamp a portion of an inert element in the inserting apparatus. This insert element advantageously has a tail portion inserted through the cylinder opening and into position to be clamped against the head by the gripping element. The projection is preferably in the form of a pair of ears arranged to form a V, and the cutting and holding member provided with an edge defining a recess figured to match an outline of an insert member and arranged for movement toward and away from the projection. the edge forms a cutter in cooperation with the projection, and a wedge-shaped abutment adjacent the edge cooperates with the projection as well to hold a severed portion of the insert member in position inside the cylinder.

The cylinder wall is advantageously thickened in the area of the cylinder opening, and a recess is provided in the cylinder and arranged associated with the cylinder opening for receiving an enlarged portion of an insert element.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary, side elevational view showing an inserting apparatus according to the present invention arranged inserted into a tubeless tire, and the like.

FIG. 3 is a fragmentary, sectional view taken generally along the line 3—3 of FIG. 1.

FIG. 4 is a fragmentary, sectional view similar to FIG. 3, but showing various elements in a moved position.

FIG. 7 is a perspective view showing a clamping device according to the present invention.

FIG. 8 is a fragmentary, sectional view showing a repair plug in position in a tubeless tire, and the like.

DESCRIPTION OF THE PREFERRED EMBODIMENTS

Figure 1:
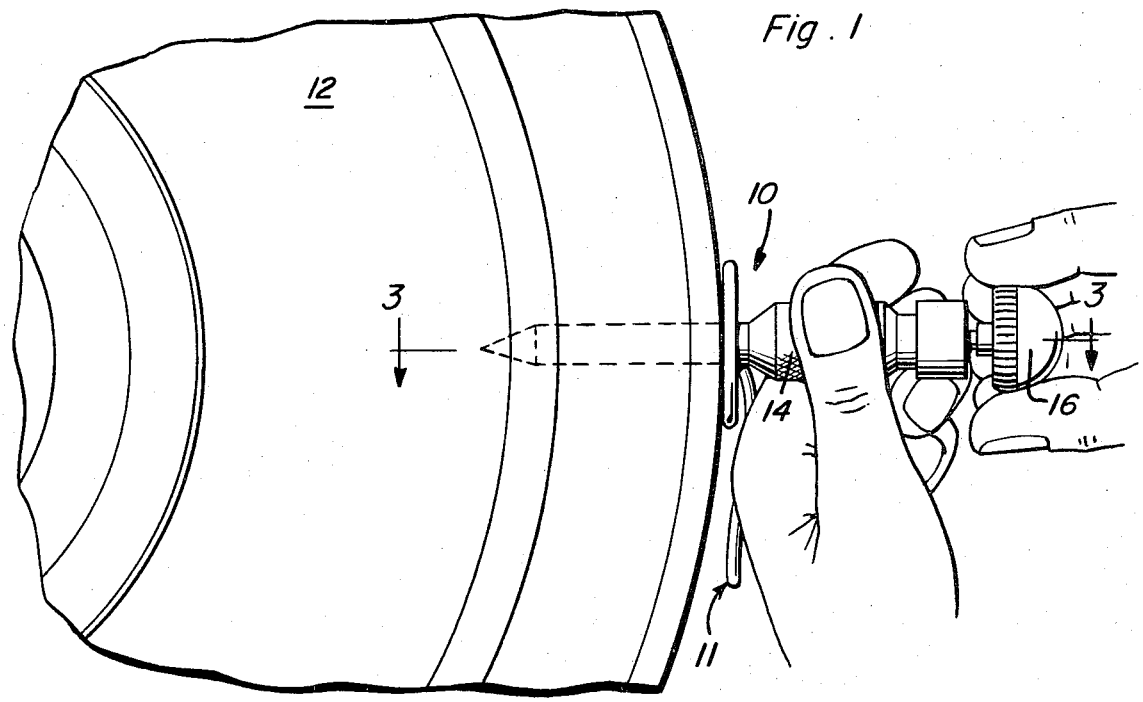
Figure 2:
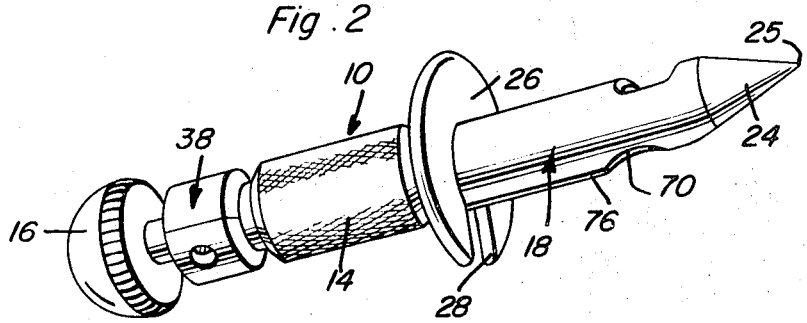
FIG. 2 is a perspective view showing an inserting apparatus according to the present invention.

FIGS. 1 and 2 of the drawings show a tool in the form of a plug inserting apparatus in the process of inserting a headed plug or insert element 11 into a, for example, tubeless tire 12. Apparatus 10 features a cylindrical housing 14, which may be, for example, knurled, and the like, to improve a hand grip on it, and a knob-like handle 16 which may be provided with various kinds of conventional finger grips, one example of which is shown in FIGS. 1 and 2.

Referring now to FIGS. 3 and 3 of the drawings, apparatus 10 has a body 18 including an elongated, hollow cylinder 20 provided in the cylinder wall adjacent the first, or upper, end portion. A conical head 24 is affixed to cylinder 20 in a suitable, known manner, such as by welding, at the first end portion, and is arranged with the apex 25 thereof pointed away from cylinder 20 for facilitating insertion of apparatus 10 into an opening of an inflatable member, such as tire 12, to be repaired. A flange 26 having a slot 28 arranged for receiving an insert element 11 is affixed to body 18 at the second, or lower, end portion thereof. This flange 26 prohibits body 18 from passing completely through a puncture in tire 12, and the like.

Although body 18 has been described above as formed from a cylinder 20, it is to be understood that a duct-like member of any desired cross section may be employed. A circular cross section, however, is preferred.

A control arrangement manually operable to activate a clamping arrangement to be described below includes a rod 30 having a portion 31 of reduced diameter and provided with, for example, screw threads. An end of rod 30 adjacent portion 31 is journaled in an end cap portion 32 of body 18 arranged at the second, or lower, end portion, and provided with a hole 34 which forms the bearing for rod 30. A flange 36 is provided on rod 30, and is arranged to act as a shoulder and restrict the insertion of rod 30 into hole 34. A bearing 38, which may be a conventional kind of split-bearing, is arranged on rod 30 and is placed about a flange 40 similar to flange 36 on rod 30. Housing 14 is keyed to portion 32 of body 18 as by a pin 42 fitted into suitable, mating holes provided in housing 14 and portion 32. The lower end of housing 14 is keyed to bearing 38 in a similar manner. Handle 16 is fastened to the lower end of rod 30 in a conventional manner as by a screw fastener.

Figure 5:
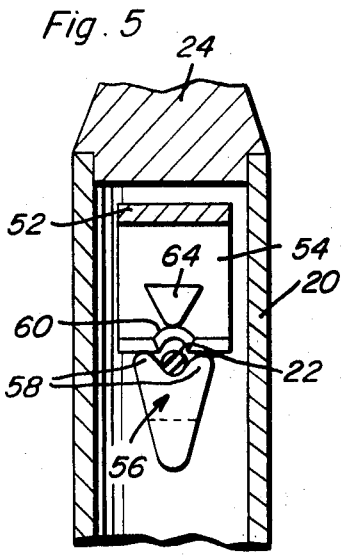
FIG. 5 is a fragmentary, sectional view taken generally along the line 5—5 of FIG. 3.
Figure 6:
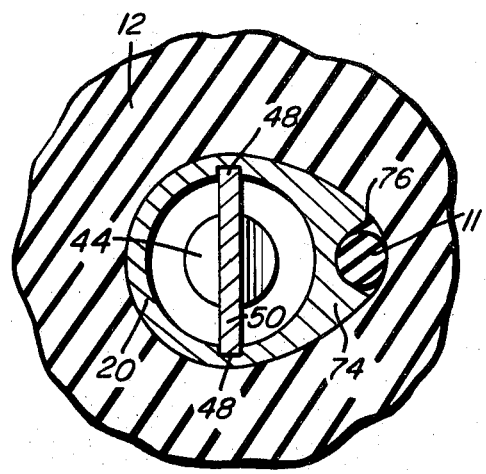
FIG. 6 is a fragmentary, sectional view taken generally along the line 6—6 of FIG. 4.

FIGS. 5 to 7 of the drawings show details of the clamping arrangement, which is also shown in FIGS. 3 and 4. This arrangement includes a longitudinal shaft 44 having a bore 46 extending along the longitudinal extent of shaft 44 and provided with internal screw threads arranged for engaging the threads on rod portion 31 to mount shaft 44 on rod 30. This thread arrangement will cause shaft 44 to be moved toward and away from head 24 when handle 16 is rotated. A pair of opposed grooves 48, it being understood that only one such groove 48 is necessary, are provided on the inner wall of cylinder 20. A plate member 50 is connected to and forms an extension of shaft 44 parallel to the longitudinal extent thereof, and is arranged in grooves 48 for being guided thereby in the longitudinal axial direction and preventing rotation of shaft 44. A gripping element 52 is connected to and arranged extending perpendicularly from plate member 50, while a cutting and holding member 54 is connected and arranged extending perpendicularly from gripping element 52 and parallel to plate member 50. In other words, this element 52 and member 54 form a hook on the upper end of plate member 50. See, in particular, FIG. 7 of the drawings.

A projection 56 is provided on the inner wall of cylinder 20 adjacent opening 22, and the cutting and holding member 54 is arranged for selectively cooperating with this projection 56 to form a cutting and holding arrangement to be described in greater detail below. Projection 56 is advantageously formed from a pair of ears 58 arranged to form a V, while member 54 is provided with an edge 60 defining a recess figured to match an outline of the tail portion 62 of insert element 11. Since edge 60 is arranged for movement toward and away from projection 56 by movement of shaft 44, plate member 50, and gripping element 52, movement of edge 60 toward projection 56 will cause tail portion 62 to be severed from the remainder of insert element 11. A wedge-shaped abutment 64 is arranged adjacent edge 60 for cooperating with ear 68 and holding tail portion 62 after it has been severed from the remainder of the insert element. Prior to the severing of tail portion 62 from an insert element 11, tail portion 62 is clamped in apparatus 10 by the cooperation of gripping element 62 and the lower surface of head 24. This step in the inserting operation is shown in FIG. 3 of the drawings. As can also be appreciated from FIG. 3, an aperture 66 is provided in plate member 50. Tail portion 62 is passed through this aperture 66 upon insertion of the tail portion through opening 22, and is manipulated between gripping element 52 and head 24 as by passing a finger (not shown) through a slot 68 formed in cylinder 20 opposite opening 22.

A recess 70 is provided in cylinder 20 and is arranged associated with the cylinder opening 22 for receiving a head or enlarged portion 2 of an insert element 11. This recess 70 is formed in a thickened portion 74 of the wall of cylinder 20. A channel 76 may be provided in the wall of cylinder 20 and arranged extending from recess 70 to slot 28 of flange 26. This channel 76 receives the shank of insert element 11 and permits easier insertion and withdrawal of apparatus 10.

As can be appreciated from FIG. 8 of the drawings, after a part or insert element 11 has been inserted into a tire 12, and the like, as shown in FIG. 3 of the drawings, and the tail portion 62 of element 11 is severed by rotating handle 16 and moving edge 60 against ears 58 as is shown in FIG. 4, apparatus 10 may be withdrawn from a pucture hole 78 in tire 12. Once the apparatus 10 has been withdrawn from hole 78, the excess portion of shank 80 of insert element 11 may be used to pull head 72 of the element flush with the inner surface of the particular wall of the inflatable member. One after head 72 has been pulled flush with this inner surface may the excess portion of shank 80 be removed in a conventional manner as by cutting with a suitable instrument (not shown).

The operation of an apparatus 10 according to the present invention for inserting a plug or insert element 11 into a tire 12, and the like, is best appreciated from FIGS. 1, 3, and 4 of the drawings. Tail portion 62 of an insert element 11 is passed through opening 22 and aperture 66. By inserting a finger (not shown) and the like into slot 68, tail portion 62 may be wrapped around gripping element 52 and the latter moved by manipulation of handle 16 toward head 24 to clamp tail portion 62 in position. This is best seen in FIG. 3 of the drawings. The enlarged portion 72 of element 11 fits into recess 70, as can also be seen in FIG. 3 of the drawings, with the tail portion arranged in the associated channel. Body 18 of apparatus 10 may now be inserted head 24 first into a puncture 78, and the like, as is best shown in FIG. 1 of the drawings. This figure also shows an example of a preferred position of the hands while performing the plug inserting operation. A suitable, known adhesive is advantageously applied to apparatus 10 before insertion to facilitate insertion by making the tool slippery,, and to bond the inserted plug to the tire. Now handle 16 may be rotated in the direction opposite to that used to clamp tailpiece 62 between gripping element 52 and head 24, and tailpiece 62 severed from the remainder of plug 11. This operation is clearly shown in FIG. 4 of the drawings. Once tailpiece 62 is severed, it is held within apparatus 10 by the action of wedge 64 cooperating with projection 56. This is also shown in FIG. 4 of the drawings. Enlarged portion 72 now forms the upper end of element 11, and is free from tail portion 62 and apparatus 10. Once apparatus 10 is withdrawn from puncture 78, the excess of shank 90 may be used to pull head 72 flush with the inner surface of the pertinent wall of the inflatable member, as is shown in FIG. 8 of the drawings, and the excess portion of shank 80 removed flush with the outer surface of the same wall.

The foregoing is considered as illustrative only of the principles of the invention. Further, since numerous modifications and changes will readily occur to those skilled in the art, it is not desired to limit the invention to the exact construction and operation shown and descirbed, and accordingly all suitable modifications and equivalents may be resorted to, falling within the scope of the invention.

What is claimed as new is as follows:

1. A plug inserting apparatus, comprising, in combination:
   a. a body;
   b. clamping means arranged on the body for clampingly engaging an insert element, cutting means for severing an engaged insert element, holding means for holding said severed portion of same; and
   c. control means connected to the cutting, holding and clamping means for selectively activating the same and selectively securing, releasing, and cutting the insert element.

2. A structure as defined in claim 1, wherein the body includes an elongated, hollow cylinder with spaced first and second end portions, an opening provided adjacent the first end portion, the clamping means arranged in the cylinder adjacent the opening, and the control means at the second end portion, a conical head provided on the cylinder at the first end portion and arranged with an apex thereof pointed away from the cylinder for facilitating insertion of the apparatus into a puncture in an inflatable member to be repaired, and a flange arranged affixed to the body at the second end portion thereof for prohibiting the body from passing completely through the puncture.

3. A structure as defined in claim 2, wherein the control means includes a rod having a portion provided with screw threads and journaled in the second end portion of the cylinder, a handle connected to the rod for rotating same, a hollow housing mounted on the cylinder at the second end portion thereof and arranged extending parallel to the rod and away from the second end portion, and a bearing mounted on the hollow housing and spaced from the second end portion, the rod arranged journaled in the bearing.

4. The structure as defined in claim 3, wherein the clamping means includes a longitudinal shaft having a bore extending along the longitudinal extent of the shaft and provided with internal screw threads of opposed direction to the rod screw threads and arranged for engaging the rod screw threads and mounting the shaft on the rod, at least one rotation-preventing groove provided in the body cylinder, a plate member extending from the shaft parallel to the longitudinal extent thereof and arranged in the groove for being guided thereby, a clamping element connected to and arranged extending perpendicularly from the plate member, a cutting and holding member connected to and arranged extending perpendicularly from the clamping element and parallel to the plate member, a projection provided on the cylinder adjacent the cylinder opening, the clamping element arranged for selectively cooperating with the head and clamping a portion of an insert element, and the cutting and holding member arranged for selectively cooperating with the projection to form the cutting means.

5. A structure as defined in claim 4, wherein the projection has a pair of ears arranged to form a V, and the cutting and holding member has an edge defining a recess figured to match an outline of an insert member and arranged for movement toward and away from the projection, the edge forming a cutter in cooperation with the projection, and a wedge-shaped abutment adjacent the edge for cooperating with the ears in holding a severed portion of the insert member.

6. A structure as defined in claim 5, wherein an aperture is provided in the plate member and is arranged for receiving a flexible insert element, and an access slot is provided in the body cylinder and arranged opposite the body opening for permitting a portion of an insert element passed through the aperture to be arranged between the clamping element and the head.

7. A structure as defined in claim 6, wherein a recess is provided in the cylinder and is arranged associated with the cylinder opening for receiving an enlarged portion of an insert element.

8. A structure as defined in claim 7, wherein the body further includes a thickened portion of a wall of the body cylinder, and the recess is arranged in the thickened portion.

9. A structure as claimed in claim 2, wherein the clamping means includes a shaft, at least one rotation-preventing groove provided in the body cylinder, a plate member extending from the shaft parallel to an extent thereof and arranged in the groove for being guided thereby, a clamping element connected to and arranged extending perpendicularly from the plate member, a cutting and holding member connected to and arranged extending perpendicularly from the clamping element and parallel to the plate member, a projection provided on the cylinder adjacent the cylinder opening, the clamping element arranged for selectively cooperating with the head and clamping a portion of an insert element, and the cutting and holding member arranged for selectively cooperating with the projection to form the cutting means.

10. A structure as defined in claim 9, wherein the projection has a pair of ears arranged to form a V, and the cutting and holding member has an edge defining a recess figured to match an outline of an insert member and arranged for movement toward and away from the projection, the edge forming a cutter in cooperation with the projection, and a wedge-shaped abutment adjacent the edge for cooperating with the ears in holding a severed portion of the insert member.

11. A structure as defined in claim 9, wherein an aperture is provided in the plate member and is arranged for receiving a flexible insert element, and an access slot is provided in the body cylinder and arranged opposite the body opening for permitting a portion of an insert element passed through the aperture to be arranged between the clamping element and the head.

12. A structure as defined in claim 11, wherein a recess is provided in the body and is arranged for receiving an enlarged portion of an insert element.

13. A structure as defined in claim 12, wherein the body is a hollow sleeve provided with a wall having a thickened portion, and the recess is arranged in the thickened portion.

14. A structure as defined in claim 1, wherein the control means includes a rod having a portion provided with screw threads and journaled in the body, a handle connected to the rod for rotating same, a hollow housing mounted on the body and arranged extending parallel to the rod and away from the body, and a bearing mounted on the hollow housing and spaced from the body, the rod arranged journaled in the bearing.

15. In a plug inserting apparatus having a body, clamping means arranged on the body for clampingly engaging an insert element, cutting means for severing an engaged insert element, and control means connected to the clamping means and cutting means for selectively activating the same, the improvement comprising the body being an elongated, hollow cylinder having a wall provided with a thickened portion, a recess provided in the thickened wall portion and arranged for receiving an enlarged portion of an insert element, and holding means for holding a severed portion of the insert member.

* * * * *